United States Patent [19]

Morohoshi et al.

[11] Patent Number: 5,616,860
[45] Date of Patent: Apr. 1, 1997

[54] AZIMUTH INDICATOR EQUIPPED WITH ANEMOMETER CAPABLE OF INDICATING BLOWING DIRECTION OF WIND

[75] Inventors: Hiroshi Morohoshi, Tokorozawa; Yuichi Masuda, Kunitachi; Yasuo Kuroki, Ome, all of Japan

[73] Assignee: Casio Computer Co., Ltd., Tokyo, Japan

[21] Appl. No.: 346,487

[22] Filed: Nov. 29, 1994

[30] Foreign Application Priority Data

Dec. 13, 1993 [JP] Japan .................................. 5-341863

[51] Int. Cl.⁶ .................................................. G01W 1/00
[52] U.S. Cl. .................................... 73/170.14; 73/170.08
[58] Field of Search .......................... 73/170.01, 170.02, 73/170.07, 170.08, 170.09, 170.11

[56] References Cited

U.S. PATENT DOCUMENTS

| | | | |
|---|---|---|---|
| 3,420,101 | 1/1969 | Adams | 73/170.08 |
| 3,713,336 | 1/1973 | Bernstein et al. | 73/170.11 |
| 5,231,876 | 8/1993 | Peet et al. | 73/170.08 |

FOREIGN PATENT DOCUMENTS 4-93632  3/1992  Japan .

*Primary Examiner*—Richard Chilcot
*Assistant Examiner*—Ronald Biegel
*Attorney, Agent, or Firm*—Frishauf, Holtz, Goodman, Langer & Chick

[57] ABSTRACT

In an azimuth indicating apparatus, there are provided a wind speed measuring unit for measuring a wind speed, an azimuth measuring unit for measuring azimuth, a display unit for displaying wind speeds measured at respective azimuths, and a display control unit for controlling the display unit to display the wind speeds measured at the respective azimuths based on the measurement results of the azimuth measuring unit and the wind speed measuring unit. Accordingly, the blowing direction of the wind is indicated by the azimuth indicating apparatus.

23 Claims, 8 Drawing Sheets

FIG.4

| ADDRESS DESIGNATION | DISPLAY REGISTER | | | |
|---|---|---|---|---|
| | M | P | CLOCK REGISTER (TIME INSTANT) | |
| P=0 | AZIMUTH DATA | WIND SPEED DATA | AZIMUTH DATA | WIND SPEED DATA |
| P=1 | AZIMUTH DATA | WIND SPEED DATA | AZIMUTH DATA | WIND SPEED DATA |
| P=2 | AZIMUTH DATA | WIND SPEED DATA | AZIMUTH DATA | WIND SPEED DATA |
| P=3 | AZIMUTH DATA | WIND SPEED DATA | AZIMUTH DATA | WIND SPEED DATA |
| P=4 | AZIMUTH DATA | WIND SPEED DATA | AZIMUTH DATA | WIND SPEED DATA |
| P=5 | AZIMUTH DATA | WIND SPEED DATA | AZIMUTH DATA | WIND SPEED DATA |
| P=6 | AZIMUTH DATA | WIND SPEED DATA | AZIMUTH DATA | WIND SPEED DATA |

AZIMUTH INDICATOR EQUIPPED WITH ANEMOMETER CAPABLE OF INDICATING BLOWING DIRECTION OF WIND

BACKGROUND OF THE INVENTION

The present invention generally relates to an azimuth indicating apparatus for measuring azimuth by detecting earth (terrestrial) magnetism. More specifically, the present invention is directed to an azimuth indicating apparatus capable of measuring wind speeds to indicate blowing directions of the wind.

DESCRIPTION OF PRIOR ART

Various types of azimuth indicators for measuring azimuth by detecting earth magnetism have been developed, and are described in, for instance, U.S. Pat. No. 4,482,255. Also, anemometers capable of measuring wind speeds are known in the field.

Typically, magnetic resistance elements are employed so as to detect earth (terrestrial) magnetism, whereas semiconductor pressure sensors are utilized in order to detect wind speeds.

The above-described conventional azimuth indicators and also anemometers can merely indicate azimuth and wind speeds, respectively, but cannot indicate or teach blowing directions of wind. That is, no operator can observe, or recognize which direction the wind is blown along.

SUMMARY OF THE INVENTION

Therefore, the present invention has an object to provide an azimuth indicating apparatus capable of recognizing wind blowing directions.

To achieve the above-described object, according to one aspect of the present invention, an azimuth indicating apparatus comprises:

wind speed measuring means for measuring a wind speed;

azimuth measuring means for measuring azimuth;

display means for displaying wind speeds measured at the respective azimuth; and display control means for controlling said display means to display the wind speeds measured at the respective azimuth based on the measurement results of said azimuth measuring means and said wind speed measuring means.

According to another aspect of the present invention, an azimuth indicating apparatus comprises:

wind speed measuring means for measuring a wind speed;

azimuth measuring means for measuring azimuth;

display means for simultaneously displaying wind speeds measured at a plurality of azimuths; and display control means for controlling said display means to simultaneously display the wind speed at each of said plural azimuths based on the measurement results of said azimuth measuring means and said wind speed measuring means.

With the above-described arrangements, since the wind speeds measured at the respective azimuths can be displayed in the azimuth indicating apparatus of the present invention, any operator can readily grasp which direction the wind is blown along.

BRIEF DESCRIPTION OF THE DRAWINGS

The above-described object and other novel features of the present invention will become more readily apparent in the following description considered in conjunction with the accompanying drawings, in which:

FIG. 4 schematically represents a memory content of RAM 10 employed in the circuit arrangement of FIG. 3;

DETAILED DESCRIPTION OF THE PREFERRED EMBODIMENTS OUTER APPEARANCE OF ELECTRONIC WRIST WATCH EQUIPPED WITH AZIMUTH INDICATOR

Figure 1:
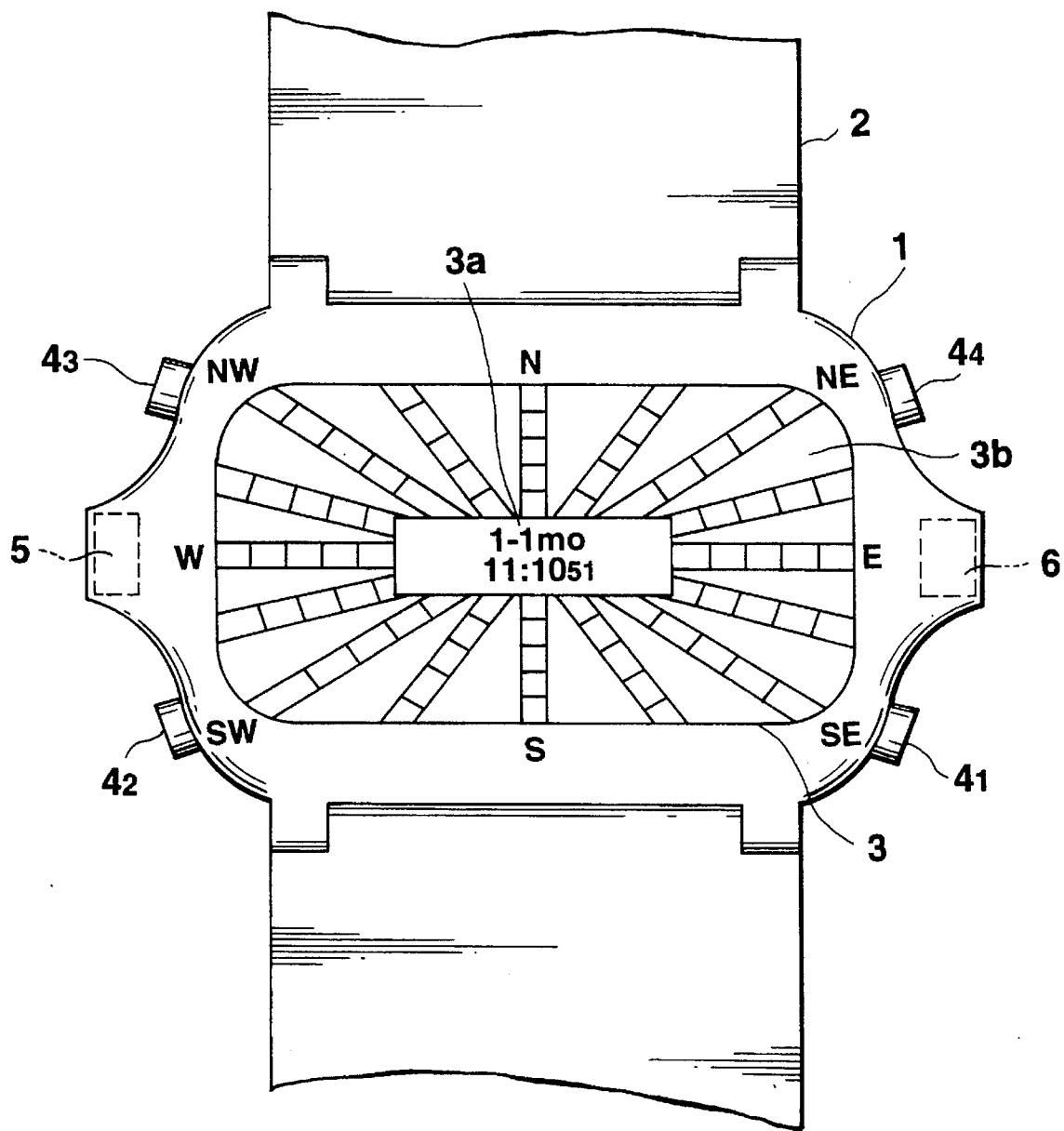
FIG. 1 is a front view of an electronic wrist watch to which an azimuth indicator is applied, according to an embodiment of the present invention.

FIG. 1 is a front view for representing an electronic wrist watch to which an azimuth indicator is applied, according to an embodiment of the present invention. In this drawing, reference numeral 1 shows a case, reference numeral 2 denotes a watchband or bracelet, and reference numeral 3 indicates a display unit using a liquid crystal display device and so on. On a digital time/date display portion 3a of a central portion of this display unit 3, both time and date are indicated, whereas on a wind speed/azimuth display portion 3b thereof, wind speeds at the respective azimuth positions are displayed in the level form in correspondence with 16 azimuth directions.

Figure 2:
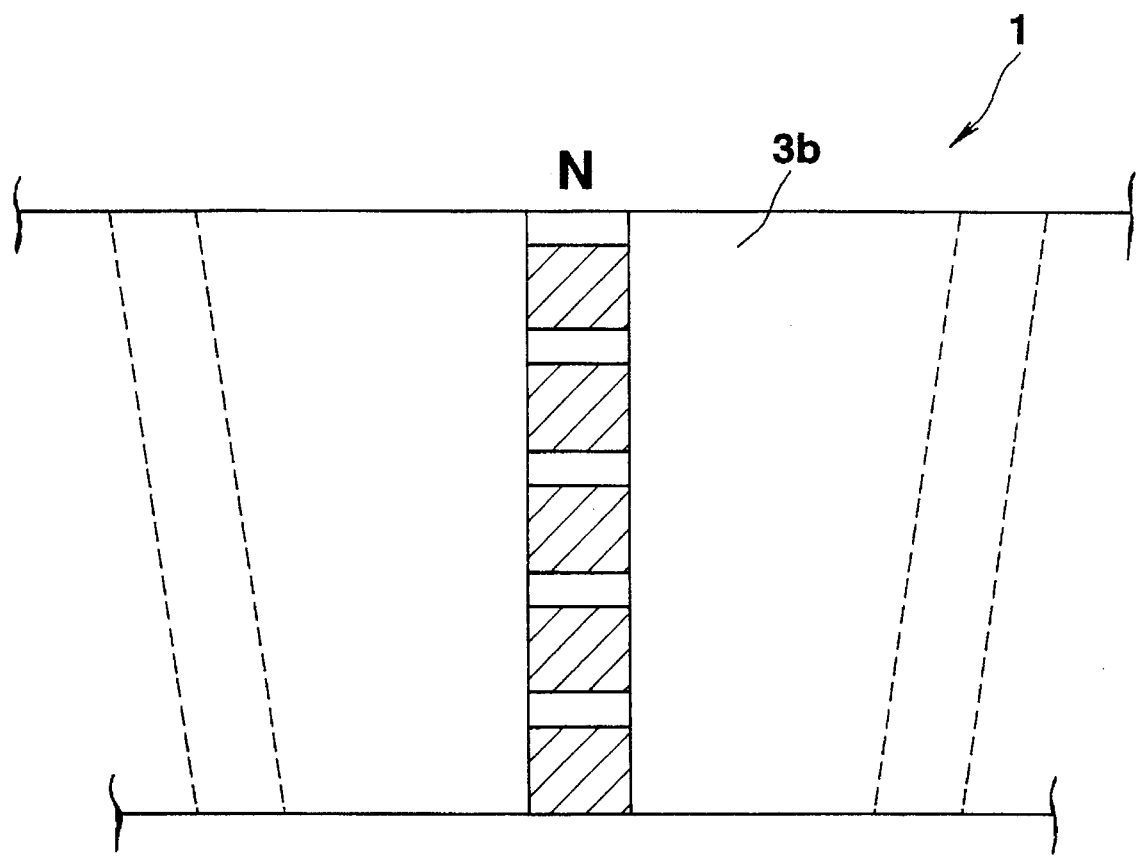
FIG. 2 is an enlarged diagram of a display unit employed in the electronic wrist watch of FIG. 1.

FIG. 2 is an enlarged diagram of the wind speed/azimuth display portion 3b corresponding to "north (N)". As shown in FIG. 2, sixteen wind speed display portions arranged in a radial form are provided on the wind speed/azimuth display portion 3b. Each of the wind speed display portions is constructed of five display members indicated by the inclined lines. The wind speeds may be displayed by these display members in the form of levels. Assuming now that a single display member corresponds to wind speed of 2 m/sec., these five display members may display a wind speed of 10 m/sec. at maximum. In this case, when the wind speed is 6 m/sec., three display members from the bottom display member are displayed in black color. In this embodiment, the wind speed per single display member may be arbitrarily set by operating a preselected switch.

On the other hand, referring back to FIG. 1, initials (N, NE, . . . , S) of the respective azimuth are stamped on the surface of the case 1 in correspondence with 8 sorts of azimuth of this display unit 3.

Reference numerals $4_1$ to $4_4$ indicate depressing button type switches. That is, the switch $4_1$ corresponds to a mode setting switch used to set either a watch mode, or an azimuth/wind speed measuring mode. The switch $4_2$ corresponds to a switch for commencing azimuth/wind speed measurement. When this switch $4_2$ is depressed, the azimuth/wind speed measurement is commenced. The switch $4_3$ corresponds to a switch for clearing measurement data. When this measurement data clearing switch is depressed, the measurement data stored in the memory is erased. Finally, the switch $4_4$ corresponds to a switch used to adjust time/date.

Reference numeral 5 indicates a dispersive type pressure sensor using the piezoelectric resistance effect, stored inside the case 1 along the clock direction of 9:00, in which a Wheatstone bridge is constructed by employing the piezoelectric resistors. Reference numeral 6 denotes a magnetic sensor using the magnetic resistance element, stored within the case 1 along the clock direction of 3:00. This magnetic sensor 6 is arranged in such a manner that four magnetic resistance elements comprise a bridge circuit, the sensitive axes of two magnetic resistance elements located opposite to each other are made coincident with each other, and the sensitive axes of two magnetic resistance elements positioned adjacent to each other are orthogonal to each other. Furthermore, two sets of coils are wound around this magnetic sensor 6 in such a way that the magnetic fields produced from these coils are orthogonal to each other.

CIRCUIT ARRANGEMENT OF FIRST WRIST WATCH

Figure 3:
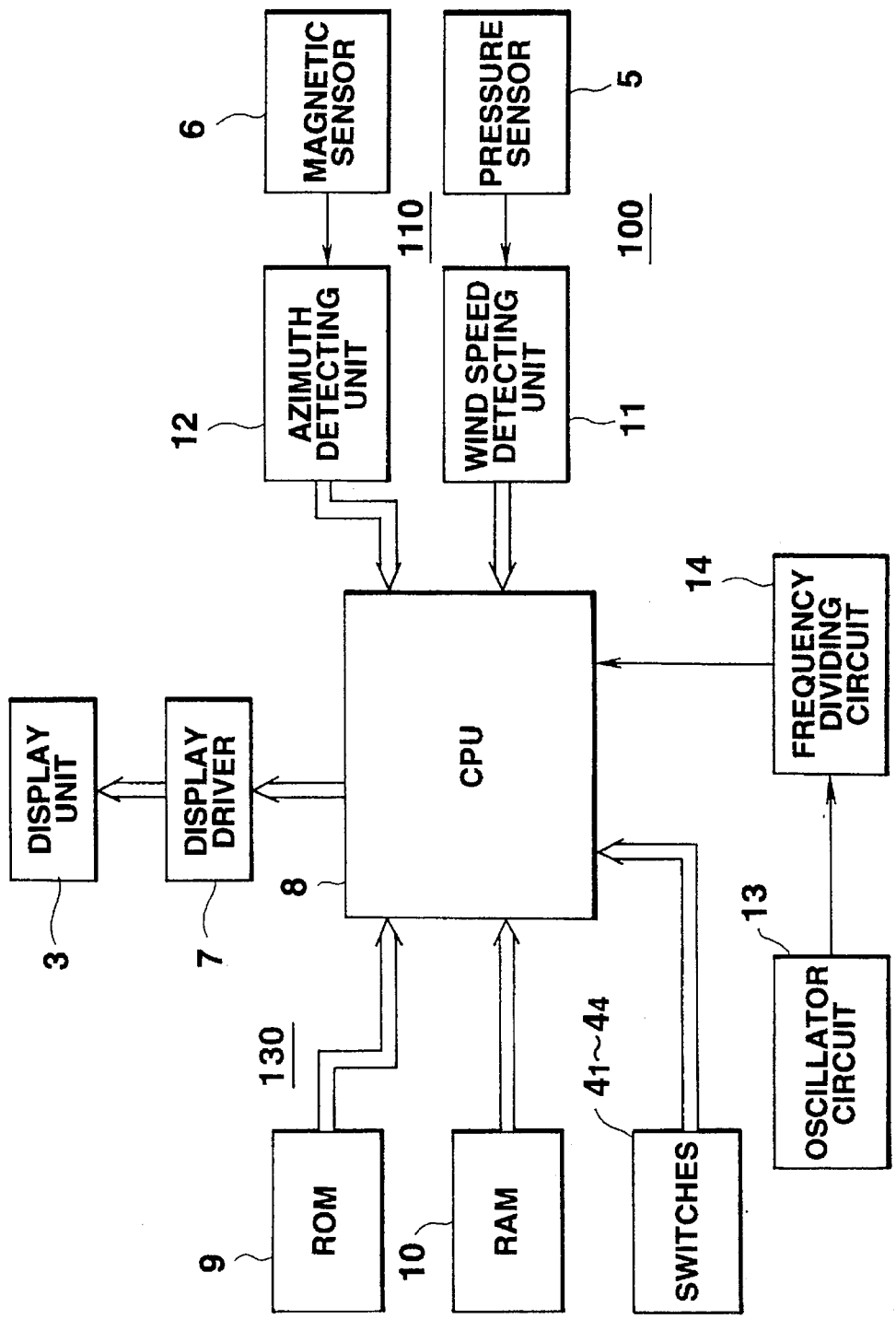
FIG. 3 is a schematic block diagram for showing a circuit arrangement of the electronic wrist watch shown in FIG. 1.

In FIG. 3 there is shown a circuit block diagram of the electronic wrist watch according to this embodiment of the present invention. In this circuit diagram, reference numeral 7 indicates a display driver for driving the display unit 3 in response to display data supplied from a CPU (central processing unit) 8. Reference numeral 9 indicates a ROM (read-only memory) for previously storing a control program, and other programs used to calculate an azimuth value based on the measured magnetism and a wind speed based on the measured pressure. Reference numeral 10 represents a RAM (random access memory) utilized as a storage area for storing various data, and a work area for obtaining azimuth and wind speeds. A memory content of this RAM 10 is partially shown in FIG. 4. In FIG. 4, "DISPLAY REGISTER" stores the display data to be supplied to the display driver 7. "M REGISTER" stores values corresponding to the various modes, namely either the clock mode, or the wind speed/azimuth measuring mode. Now, "M=0" corresponds to the clock mode, and "M=1" corresponds to the wind speed/azimuth measuring mode. In this case, the azimuth/wind speed measurement start switch $4_2$ is depressed to set "M=1". "CLOCK REGISTER" stores time instants. "P REGISTER" is to designate destination of writing the azimuth/wind speed data. It should be noted that the azimuth data and the wind speed data are written into regions other than the above-described registers. In this embodiment, 16 sets of azimuth data as well as wind speed data may be stored.

Referring back to the circuit diagram of FIG. 3, reference numeral 11 represents a wind speed detecting unit for driving the pressure sensor 5 to acquire the pressure measurement data. Reference numeral 12 indicates an azimuth detecting unit for driving the magnetic sensor 6 to acquire the output from the magnetic sensor 6. Reference numeral 13 indicates an oscillator circuit for oscillating a clock signal which will be supplied to a frequency dividing circuit 14. Upon receipt of the clock signal, the frequency dividing circuit 14 frequency-divides this clock signal to output the frequency-divided clock signal. The CPU 8 controls the respective circuit units of this electronic wrist watch, performs the clock operation, and calculates the azimuth data and wind speed data.

The above-described pressure sensor 5 and wind speed detecting means 11 comprise a wind speed measuring means 100, and both the magnetic sensor 6 and the azimuth detecting unit 12 comprise an azimuth measuring means 110.

OPERATIONS OF FIRST ELECTRONIC WRIST WATCH

Referring now to flow charts shown in FIG. 5 to FIG. 7, operations of the first electronic wrist watch with the above-described circuit arrangement will be described. It should be noted in this first embodiment that one display member of the wind speed/azimuth display portion 3b (see FIG. 2) is set to the wind speed of 2 m/sec.

Figure 5:
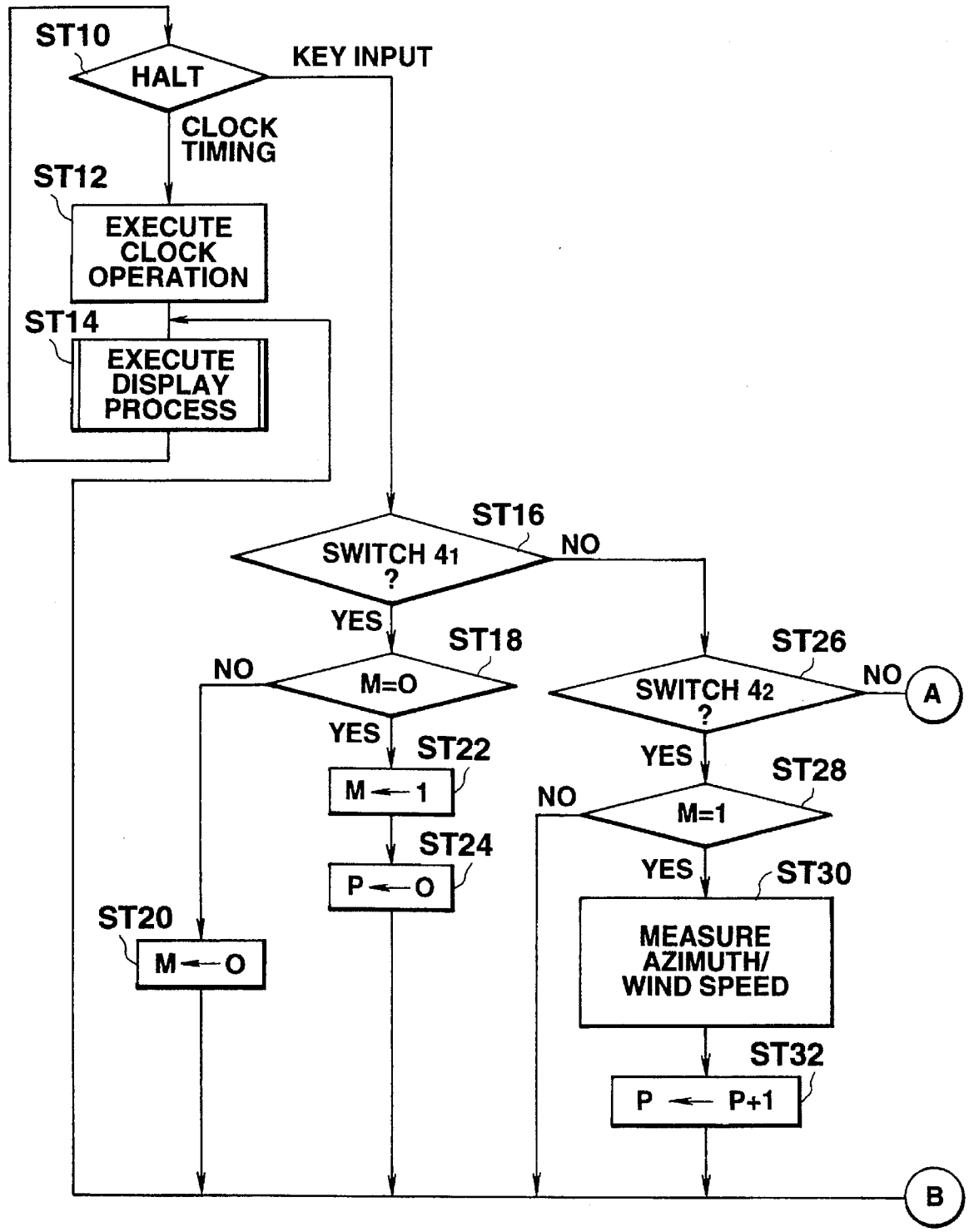
FIG. 5 is a flow chart for explaining azimuth/wind speed data processing operations executed in the electronic wrist watch of FIG. 1.

In the first flow chart shown in FIG. 5, a first check is done as to whether or not the first electronic wrist watch is under a waiting condition at a step ST 10. In this case, when the frequency dividing circuit 14 produces the frequency-divided clock signal, namely the clock timing (for example, 1/10 sec.) is produced, "1/10 sec." is added to the content of the clock register (see FIG. 4). Subsequently, the display process operation is carried out at a step ST 14. In this display process, the present time is displayed on the date/time display portion 3a. When this display process operation is completed, the process operation is returned to the step ST 10.

When any one of the depression keys $4_1$ to $4_4$ is manipulated at the step ST 10, a check is done as to whether or not the mode setting switch $4_1$ is performed at a step ST 16. When it is judged that the mode setting switch $4_1$ is manipulated, another judgement is made as to whether or not the content of the M register is equal to "0". When it is so Judged that the content of this M register is not equal to "0" at this step ST 18, the content of the M register is set to "0" at a step ST 20. After this process operation is accomplished, the process operation is advanced to a step ST 14 at which the present time is displayed.

When it is so judged at the step ST 18 that the content of the M register is equal to "0", the content of this M register is set to "1" at a step ST 22. Then, the content of the P register is set to "0" at a step ST 24. Upon completion of the above-described process operation, the process operation is advanced to a step ST 14 at which the present time is displayed.

On the other hand, if it is so judged at the previous judging step ST 16 that the mode setting switch $4_1$ is not manipulated, then another judgement is performed at a step ST 26 as to whether or not the azimuth/wind speed measurement starting switch $4_2$ is operated. Then, if it is Judged at this step ST 26 that this azimuth/wind speed measurement starting switch $4_2$ is operated, then another check is made at a step ST 28 as to whether or not the content of the M register is equal to "1". In this judgement, when the content of the M register is equal to "0", the process operation is advanced to the step ST 14. To the contrary, when it is so judged that the content of the M register is equal to "1", the azimuth and the wind speed are measured at a step ST 30. That is, the output derived from the wind speed detecting unit 11 is acquired and also the output derived from the azimuth detecting unit 12 is acquired, so that both the azimuth and the wind speed are calculated based on these output values under control of the CPU 8.

When both the azimuth and the wind speed are calculated, the resulting azimuth data and wind speed data are written into the memory region of the RAM 10 which is addressed by P=0. After both the azimuth data and the wind speed data have been written, "1" is added to the address designation value of the P register at a step ST 32. That is, it is set to P=1. Thereafter, the process operation is advanced to a step ST 14 at which both azimuth and wind speed are displayed based on the azimuth data and the wind speed data written into the memory region addressed by P=0. For instance, assuming that the measured azimuth is "north (N)" and the wind speed measured at this azimuth is 10 m/sec., as illustrated in FIG. 2, all of the five display members positioned in the north "N" (namely, clock direction of "0:00") are displayed in black color. Upon completion of this display process, the process operation is returned to the step ST 10. Now, when the azimuth/wind speed measurement starting switch $4_2$ is further operated with slightly changing the direction of the first electronic wrist watch, process operations defined at a step ST 30 and a step ST 32 are carried out. In this case, the calculated azimuth data and the wind speed data are written into the memory region of the RAM 10 addressed by P=1. Then, both azimuth and wind speed are displayed based on the azimuth data and the wind speed data, which are written into the memory region addressed by P=1. Subsequently, both the azimuth data and the wind speed data are produced every time the azimuth/wind speed measurement starting switch $4_2$ is manipulated, and thus both azimuth and wind speeds are displayed based on the calculated wind speed data/azimuth data.

Figure 6:
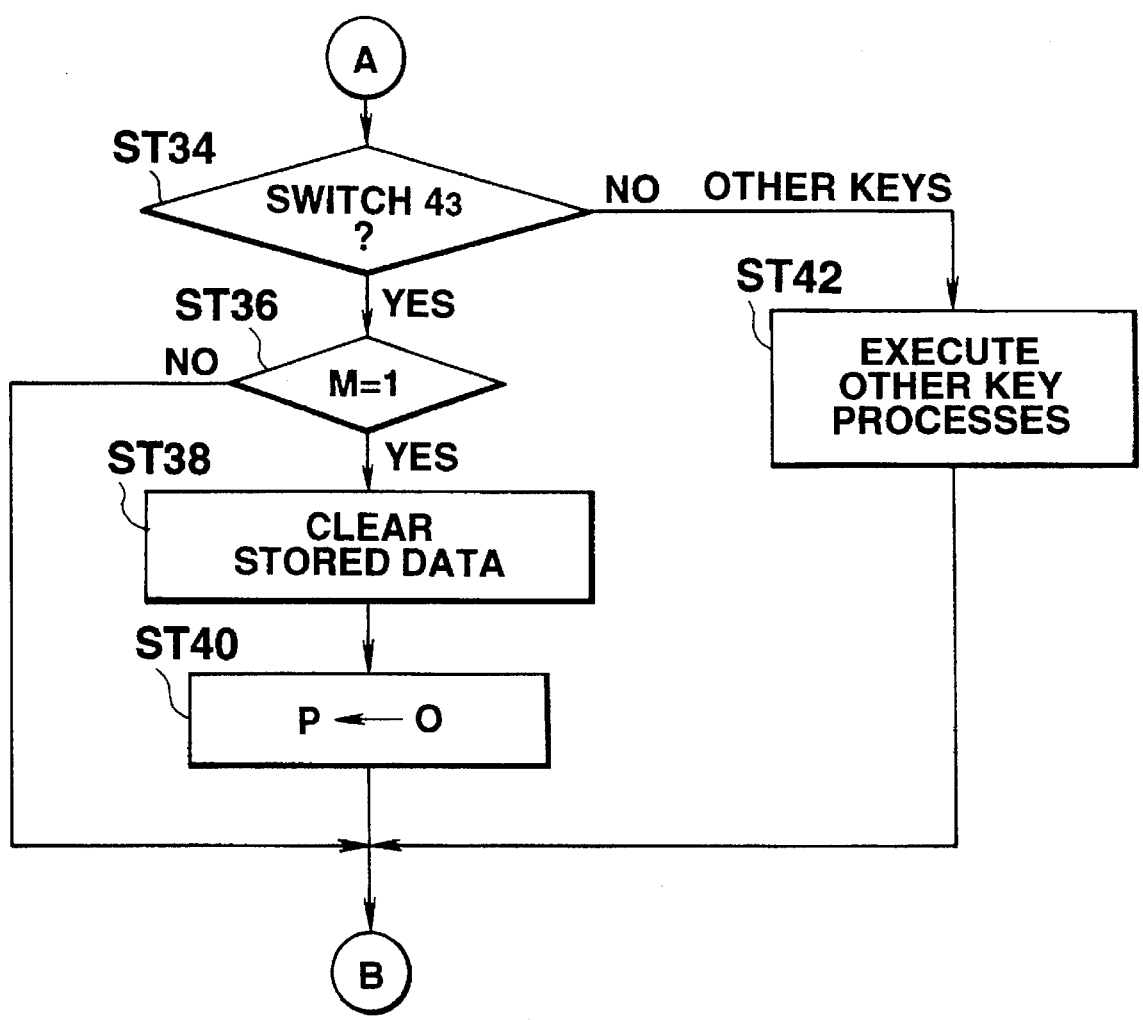
FIG. 6 is another flow chart of the azimuth/wind speed data processing operations subsequent to the flow operation of FIG. 5.

On the other hand, when it is so judged at the previous step ST 26 that the azimuth/wind speed measurement starting switch $4_2$ is not operated, another judgement is performed as to whether or not the measurement data clear switch $4_3$ is manipulated at a step ST 34 shown in a flow chart of FIG. 6. If it is so judged that this measurement data clear switch $4_3$ is operated, then another check is made as to whether or not the storage content of the M register is equal to "1" at a step ST 36. In this judgement, when it is so decided that the content of the M register is not equal to "1", the process operation is advanced to a step ST 14. To the contrary, when it is so judged that the content of the M register is equal to "1", the measurement data are erased at a step ST 38 (see FIG. 6). That is, all of the azimuth data and the measurement data, which have been written into the designated memory region of the RAM 10, are erased. After the respective data have been erased, the content of the P register is set to "0" at a step ST 40, and subsequently the process operation is advanced to the step ST 14.

When it is so judged at the step ST 34 that no measurement data clear switch $4_3$ is operated, the process operation is advanced to a step ST 42 at which another key process operation is carried out. Subsequently, the process operation is advanced to a step ST 14.

Figure 7:
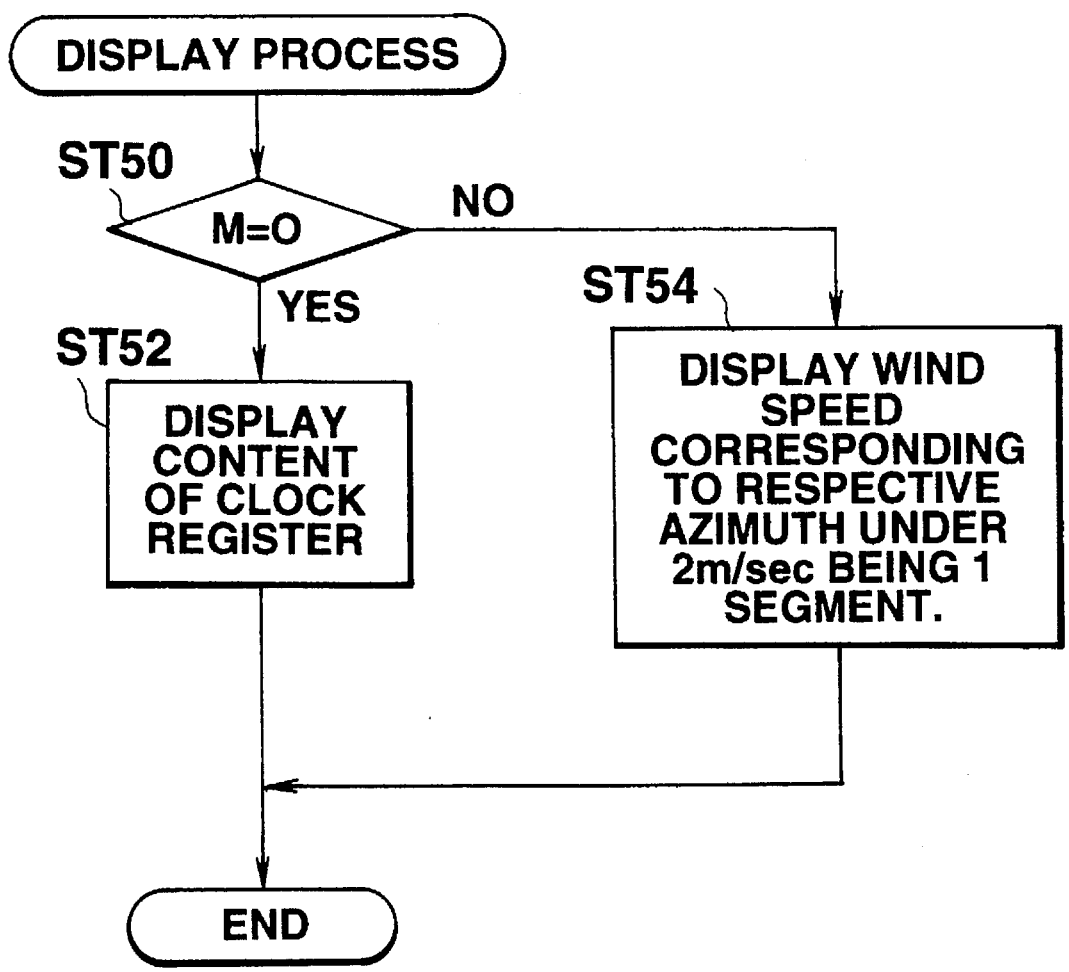
FIG. 7 is a flow chart for representing a detailed display processing operation defined in the flow chart of FIG. 5.

The display process defined at this step ST 14 is carried out as shown in a flow chart of FIG. 7. At a first step ST 50, a judgement is performed as to whether or not the content of the M register is equal to "0". At this judging step, if the content of this M register is equal to "0", then the content of the clock register (see FIG. 4) is displayed at the step ST 52. Conversely, if the content of this M register is not equal to "0", then the wind speed corresponding to the measured azimuth is displayed.

As described above, the wind speeds at the respective azimuths can be displayed in addition to the display of time instants.

It should be noted that although a single display body is displayed as 2 m/sec. in the above-described first embodiment, the wind speed displayable by a single display body may be arbitrarily set.

CIRCUIT ARRANGEMENT OF SECOND ELECTRONIC WRIST WATCH

Figure 8:
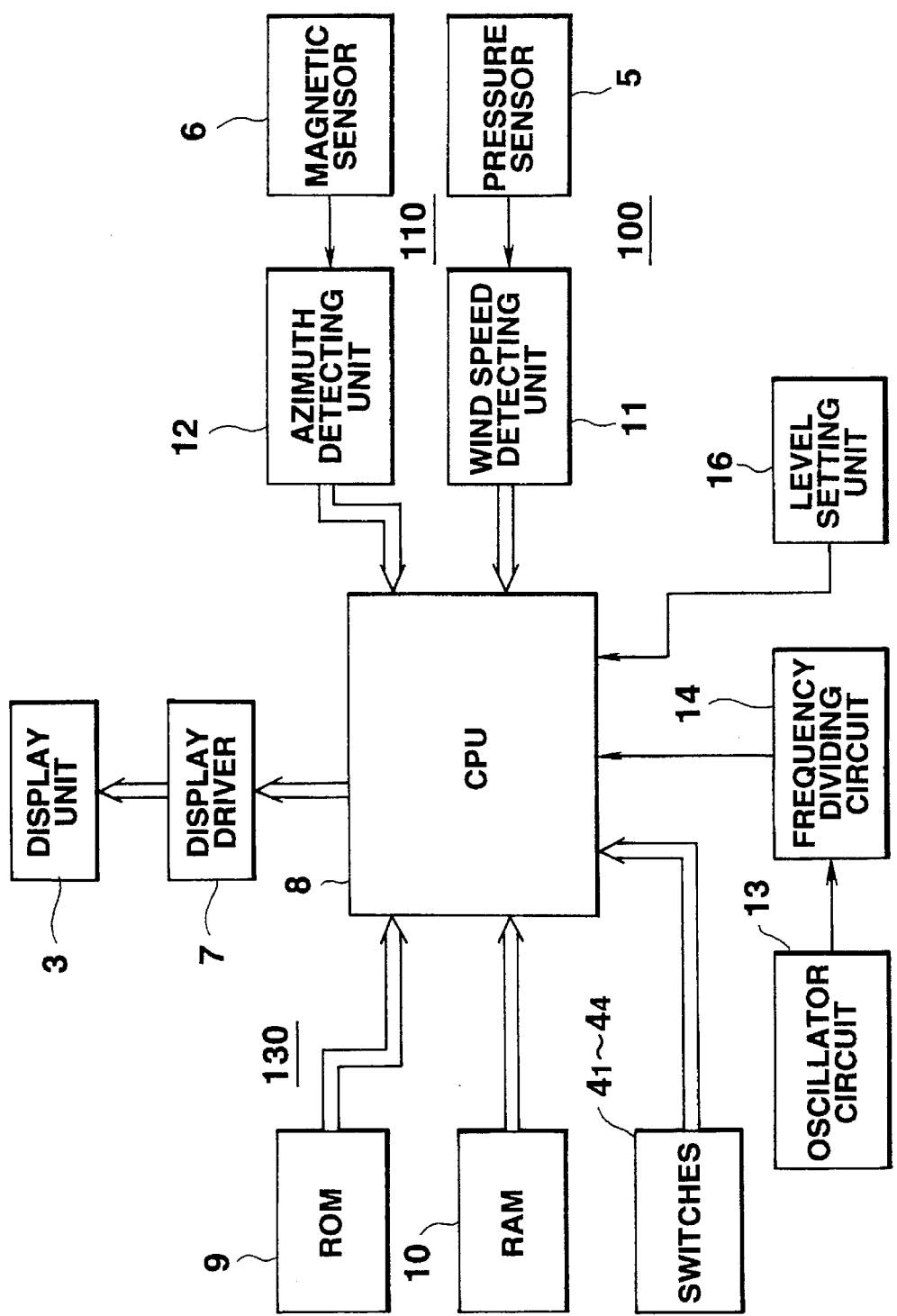
FIG. 8 is a schematic block diagram for indicating a circuit arrangement of another electronic wrist watch to which another azimuth indicator is applied, according to a modification of the present invention.

FIG. 8 is a schematic block diagram for representing a circuit arrangement of another electronic wrist watch, according to a second embodiment of the present invention, which newly employs a display level setting unit 16 capable of arbitrarily setting the wind speed per a single display member. In this drawing, the CPU 8 may decide the wind speed per a single display member in accordance with the set value of the display level setting unit 16.

Since the wind speed per one single display member can be arbitrarily set in this second electronic wrist watch, the maximum wind speed at the respective conditions can be displayed. For instance, in such a case that a single display body displays 2 m/sec. and five display members are employed in total, the maximum wind speed up to 10 m/sec. may be displayed in the second electronic wrist watch. Alternatively, when a single display member indicates 4 m/sec., the maximum wind speed up to 20 m/sec. may be displayed.

Although the present invention has been applied to the electronic wrist watches in the above-described embodiments, the present invention is not limited thereto, but may be applied to, for instance, a portable azimuth indicator and a portable barometer.

Furthermore, although the azimuth/wind speed display portion 3b of the display unit 3 is exclusively used to display the wind speed and the azimuth in the above-described embodiments, this azimuth/wind speed display portion 3b may be used as a second hand of this wrist watch when neither the azimuth, nor the wind speed is displayed.

What is claimed is:

1. An azimuth indicating apparatus, comprising:

azimuth measuring means for measuring azimuth;

wind speed measuring means for measuring a wind speed in an azimuth;

display means having a plurality of wind speed display portions each for indicating a wind speed in an appropriate azimuth, each wind speed display portion including plural display members adapted to be turned on to indicate a wind speed;

setting means for setting a predetermined maximum wind speed to be indicated by said wind speed display portions of said display means; and display control means for controlling said display means to which the predetermined maximum wind speed to be indicated is set by said setting means to turn on the display members in one of the plurality of wind speed display portions depending on the measurement result of said azimuth measuring means to indicate a wind speed measured in an azimuth by said wind speed measuring means.

2. An azimuth indicating apparatus as claimed in claim 1 wherein said plurality of wind speed display portions are arranged in a radial direction.

3. An azimuth indicating apparatus as claimed in claim 2 wherein a central portion of said plurality wind speed display units arranged in the radial direction includes a digital display portion.

4. An azimuth indicating apparatus as claimed in claim 1 wherein said wind speed measuring means includes a semiconductor pressure sensor.

5. An azimuth indicating apparatus as claimed in claim 1 wherein said azimuth measuring means includes an earth (terrestrial) magnetism sensor.

6. An azimuth indicating apparatus as claimed in claim 1, further comprising:

present time measuring means for counting present time data; and present time display means for displaying present time based upon said present time data counted by said present time measuring means.

7. An azimuth indicating apparatus as claimed in claim 1, further comprising:

a case for storing therein said respective means employed in said azimuth indicating apparatus; and bands fixed on both edges of said case, for mounting said case on an arm of an operator.

8. An azimuth indicating apparatus, comprising:

azimuth measuring means for measuring azimuth;

wind speed measuring means for measuring a wind speed in an azimuth;

display means having a plurality of wind speed display portions each for indicating a wind speed in an appropriate azimuth, each wind speed display portion including plural display members adapted to be turned on to indicate a wind speed;

setting means for setting a predetermined maximum wind speed to be indicated by said wind speed display portions of said display means;

a memory for storing plural wind speeds measured by said wind speed measuring means together with azimuths obtained from the azimuth measurement made by said azimuth measuring means, in which the wind speeds are measured by said wind speed measuring means; and display control means for controlling said display means to which the predetermined maximum wind speed to be indicated is set by said setting means to turn on the display members in one of the plurality of wind speed display portions selected depending on the azimuth stored in said memory to indicate the wind speed in said azimuth stored in said memory.

9. An azimuth indicating apparatus as claimed in claim 8 wherein said plurality of wind speed display portions are arranged in a radial direction.

10. An azimuth indicating apparatus as claimed in claim 9 wherein a central portion of said plurality of wind speed display units arranged in the radial direction includes a digital display portion.

11. An azimuth indicating apparatus as claimed in claim 8 wherein said wind speed measuring means includes a semiconductor pressure sensor.

12. An azimuth indicating apparatus as claimed in claim 8 wherein said azimuth measuring means includes an earth (terrestrial) magnetism sensor.

13. An azimuth indicating apparatus as claimed in claim 8, further comprising:

present time measuring means for counting present time data; and present time display means for displaying present time based upon said present time data counted by said present time measuring means.

14. An azimuth indicating apparatus as claimed in claim 8, further comprising:

a case for storing therein said respective means employed in said azimuth indicating apparatus; and bands fixed on both edges of said case, for mounting said case on an arm of an operator.

15. An azimuth indicating apparatus, comprising:

wind speed measuring means including a semiconductor pressure sensor for measuring a wind speed;

azimuth measuring means including an earth (terrestrial) magnetism sensor for measuring azimuth;

display means for indicating wind speeds in various azimuths measured by said wind speed measuring means;

a memory for storing plural wind speeds measured by said wind speed measuring means together with azimuths obtained from the azimuth measurement made by said azimuth measuring means, in which the wind speeds are measured by said wind speed measuring means; and display control means for controlling said display means to indicate the plural wind speeds stored in said memory together with the azimuths of the wind stored in said memory.

16. An azimuth indicating apparatus as claimed in claim 15, wherein:

said wind speed measuring means includes a semiconductor pressure sensor.

17. An azimuth indicating apparatus as claimed in claim 15, wherein said azimuth measuring means includes an earth (terrestrial) magnetism sensor.

18. An azimuth indicating apparatus as claimed in claim 15, further comprising:

present time measuring means for counting present time data; and present time display means for displaying present time based upon said present time data counted by said present time measuring means.

19. An azimuth indicating apparatus as claimed in claim 15, further comprising:

a casing for storing therein said respective means employed in said azimuth indicating apparatus; and straps fixed on edges of said casing, for attaching said casing on the arm of an operator.

20. An azimuth indicating apparatus, comprising:

wind speed measuring means for measuring a wind speed;

azimuth measuring means for measuring azimuth;

display means for indicating wind speeds in various azimuths measured by said wind speed measuring means;

a memory for storing plural wind speeds measured by said wind speed measuring means together with azimuths obtained from the azimuth measurement made by said azimuth measuring means, in which the wind speeds are measured by said wind speed measuring means;

display control means for controlling said display means to indicate plural wind speeds together with the azimuths of the wind stored in said memory;

a casing for containing therein said wind speed measuring means, said azimuth measuring means, said display means, said memory and said display control means; and straps fixed to said casing, used by a user to attach said casing on the user's arm.

21. An azimuth indicating apparatus as claimed in claim 20, wherein:

said wind speed measuring means includes a semiconductor pressure sensor.

22. An azimuth indicating apparatus as claimed in claim 20, wherein said azimuth measuring means includes an earth (terrestrial) magnetism sensor.

23. An azimuth indicating apparatus as claimed in claim 20, further comprising:

present time measuring means for counting present time data; and present time display means for displaying present time based upon said present time data counted by said present time measuring means.

* * * * *